US010988082B2

(12) United States Patent
Lettis et al.

(10) Patent No.: US 10,988,082 B2
(45) Date of Patent: Apr. 27, 2021

(54) HOUSING FOR A REAR VIEW ELEMENT OF A REAR VIEW DEVICE FOR A VEHICLE

(71) Applicant: SMR Patents S.A.R.L., Luxembourg (LU)

(72) Inventors: Andrew Lettis, Chichester (GB); David Gaskin, Hampshire (GB)

(73) Assignee: SMR Patents S.à.r.l., Luxembourg (LU)

( * ) Notice: Subject to any disclaimer, the term of this patent is extended or adjusted under 35 U.S.C. 154(b) by 590 days.

(21) Appl. No.: 15/706,029

(22) Filed: Sep. 15, 2017

(65) Prior Publication Data
US 2018/0079363 A1    Mar. 22, 2018

(30) Foreign Application Priority Data
Sep. 16, 2016   (DE) .................... 10 2016 117 488.2

(51) Int. Cl.
*B60R 1/06* (2006.01)
*B60R 1/12* (2006.01)

(52) U.S. Cl.
CPC .............. *B60R 1/06* (2013.01); *B60R 1/12* (2013.01); *B60R 2001/1253* (2013.01)

(58) Field of Classification Search
CPC ...... B60R 1/06; B60R 1/12; B60R 2001/1253
USPC ........................................ 359/841, 871, 872
See application file for complete search history.

(56) References Cited

U.S. PATENT DOCUMENTS

| | | | | | |
|---|---|---|---|---|---|
| 2,202,697 | A | * | 5/1940 | La Hodny | B60R 1/02 359/514 |
| 4,125,244 | A | * | 11/1978 | Lukey | B60R 1/076 248/475.1 |
| 5,245,480 | A | * | 9/1993 | Polzer | B60R 1/06 359/841 |
| 5,583,703 | A | * | 12/1996 | Lang | B60R 1/0605 248/481 |
| 5,604,644 | A | * | 2/1997 | Lang | B60R 1/0605 359/871 |
| 5,760,980 | A | * | 6/1998 | Lang | B60R 1/0612 359/862 |
| 6,217,181 | B1 | * | 4/2001 | Lynam | B60R 1/0602 359/604 |

(Continued)

FOREIGN PATENT DOCUMENTS

EP         1138552 A2    4/2001

OTHER PUBLICATIONS

Examination report dated Apr. 28, 2017 from related DE 10 2016 117 488.2 (not translated).

*Primary Examiner* — Ricky D Shafer
(74) *Attorney, Agent, or Firm* — Jones Day

(57) ABSTRACT

A housing for a rear view element of a rear view device for a vehicle includes a scalp portion having a first joint section at a first circumferential edge extending at least partially around an opening of the scalp portion, and a bezel portion including a second joint section at a second circumferential edge extending at least partially around the bezel section, where the first joint section of the scalp portion and the second joint section of the bezel portion are connectable to each other at a separation edge. The first joint section and the second joint section may be connectable, with the first joint section having at least one clamp and the second joint section having at least one protrusion.

12 Claims, 2 Drawing Sheets

(56) References Cited

U.S. PATENT DOCUMENTS

| | | | |
|---|---|---|---|
| 6,419,300 B1* | 7/2002 | Pavao | B60R 1/06 296/152 |
| 6,712,329 B2* | 3/2004 | Ishigami | B60R 1/06 248/475.1 |
| 7,614,755 B2* | 11/2009 | Branham | B60R 1/06 24/456 |
| 8,016,437 B2* | 9/2011 | Wakabayashi | B60R 1/06 359/841 |
| 8,177,401 B2* | 5/2012 | Hwang | B60R 1/1207 362/494 |
| 8,568,006 B2* | 10/2013 | Asai | B60R 1/1207 362/494 |
| 8,579,444 B2* | 11/2013 | Lettis | B60R 1/06 359/871 |
| 8,727,412 B2 | 5/2014 | Wolf et al. | |
| 2001/0028178 A1* | 10/2001 | Mizutani | B60R 1/06 296/152 |
| 2010/0296189 A1 | 11/2010 | Lettis et al. | |
| 2017/0349101 A1* | 12/2017 | Eto | B60R 1/06 |

* cited by examiner

HOUSING FOR A REAR VIEW ELEMENT OF A REAR VIEW DEVICE FOR A VEHICLE

CROSS-REFERENCE TO RELATED APPLICATIONS

This application claims the benefit of foreign priority to German Patent Application No. DE 10 2016 117 488.2, filed Sep. 16, 2016, which is herein incorporated by reference in its entirety for all purposes.

STATEMENT REGARDING FEDERALLY SPONSORED RESEARCH OR DEVELOPMENT

Not applicable.

REFERENCE TO A COMPACT DISK APPENDIX

Not applicable.

BACKGROUND

1. Field

The following description relates to a housing for a rear view element of a rear view device for a vehicle, preferably a motor vehicle. The housing may include a scalp portion having a first joint section at a first circumferential edge extending at least partially around an opening of the scalp portion. In addition, the housing may include a bezel portion having a second joint section at a second circumferential edge extending at least partially around the bezel section, where the first joint section of the scalp portion and the second joint section of the bezel portion are connectable to each other at a separation edge.

2. Description of Related Art

In vehicles, rear view elements such as the reflective elements that are employed in rear view devices are used for helping the driver to see areas behind and to the sides of the vehicle. These elements are usually included in housings mounted to a side of the vehicle. The housing has essentially the purpose to hold the rear view element at an adjustable position relative to the vehicle so that the driver of the vehicle can adjust the rear view element to correspond to the driver's seating position to obtain good rearward visibility. Also, the housing helps to protect the rear view device from outside influences, i.e. rain, wind, etc. Furthermore, most housings are aerodynamically shaped to reduce the drag coefficient of the vehicle.

Typically, the housings include several components, or portions, where a bezel portion surrounds and secures the rear view element, a scalp portion, that might be aerodynamically shaped, protects the rear view element from outside influences. Typically, the separation edge, or joint between the bezel portion and the scalp portion is traditionally located within a channel arranged in a circumferential region of the housing. These channels are traditionally employed to minimize wind noise and to collect water droplets. For example, U.S. Pat. No. 8,727,412 B2 describes such a housing, where the bezel portion and the scalp portion are connected at a separation edge located in the channel.

However, arranging the separation edge in such a channel, may cause wind noise due to the high speed around the separation edge. A one piece housing, where the scalp portion and the bezel portion are formed in one component, are sometimes used to make the separation edge redundant. However, manufacturing these one piece housings using an injection molding process results in complex processing and thick walled moldings.

EP Patent Application No. 1 138 552 A2 describes a rearview mirror assembly for a vehicle having a mirror with a rear surface and an outer periphery, and a visor which includes a visor cover for covering the rear surface of the mirror and a visor rim for surrounding the outer periphery of the mirror, the visor rim having an annular end portion. The visor cover has an annular end portion which engages with the annular end portion of the visor rim when the visor cover and the visor rim are assembled to each other, and where the engagement of the visor cover annular end portion and visor rim annular end portion with one another forms a loop-shaped opposing portion between a surrounding wall of the visor cover and a surrounding wall of the visor rim or between a connecting portion integrally formed with a main body of said visor cover and a lid integrally formed with a main body of the visor rim as a boundary between the visor cover and the visor rim. The loop-shaped opposing portion is exposed at the open end of the visor substantially towards the rear of the vehicle.

The following description aims at providing a housing for a rear view device for a vehicle that overcomes the above mentioned problems. In particular, in an aspect, it is an object to further develop the known housing to have a pleasing as well as aerodynamic design and a simple structure.

SUMMARY OF THE INVENTION

The following description solves the above mentioned problems by providing a separation edge that is located at least partly at an inside panel of the bezel portion. In addition, the first joint section comprises at least one clamp, preferably a continuous clamp extending at least partly along the first circumferential edge, and/or the second joint section comprises at least one protrusion, preferably a continuous protrusion extending at least partly along the second circumferential edge. Still further the clamp is adapted to at least partly overlap the protrusion to obtain a flush surface at the separation edge, preferably the clamp is curved at approximately 180° to hold the protrusion.

In the context of this disclosure, the term 'scalp portion' can be used to refer to a scalp, or cover that can be used to cover and/or to shield the various items that could be arranged in the housing of a rear view device. The term 'bezel portion' can be used to refer to a structure that at least partly surrounds the rear view element and holds the rear view element. Also, the term 'opening' can be used to refer to a material-free part of the surface of the bezel portion that houses at least parts of the scalp portion when scalp portion and bezel portion are mounted together. The term 'separation edge' can be used to refer to a connection edge, and/or to a location where scalp portion and bezel portion can be connected.

In one example, the scalp portion includes a first rim that is adapted to complement at least in part a second rim of the bezel portion when the scalp portion and the bezel portion are connected together, preferably wherein in a connected state a resulting rim encircles essentially the circumference of the bezel portion.

Here, the term 'rim encircles essentially the circumference of the bezel portion' can be used to define a resulting closing edge of the connected scalp portion and bezel portion when viewed towards the rear view element. Also, the term 'rim' can be used to refer to the end, and/or to an extension of the inside panel.

In one example, the separation edge is located between the first rim and the inside panel of the bezel portion.

In one example, the clamp is adapted to at least partly overlap the protrusion to obtain a flush surface at the separation edge, preferably the clamp is curved at approximately 180° to hold the protrusion.

In one example, the bezel portion is adapted to surround at least partly the rear view element and/or to secure the rear view element in the housing.

In one example, the scalp portion is adapted to at least partly shield the rear view element.

In one example, the housing includes a foot portion connectable to the vehicle, wherein the foot portion is connectable to the scalp portion and/or to the bezel portion to hold the scalp portion and/or the bezel portion.

In one example, the scalp portion comprising a channel, preferably a water channel, extending on the top side of the scalp portion essentially parallel to the separation edge.

In one example, the scalp portion and/or the bezel portion includes/include plastic material, and is/are produced in an injection molding process.

The invention also relates to a rear view display device for a vehicle, preferably for a motor vehicle, comprising at least one housing according to the invention.

In one example, the rear view display device includes a camera and/or a reflective element, preferably a mirror element.

Also, the invention relates to a vehicle comprising a rear view display device according to the invention.

It has been advantageously found that by locating the separation edge at least partly at an inside panel of the bezel portion, wind noises can be significantly reduced, because the separation edge is located in a low pressure air zone, avoiding the vehicle airflow direction.

Also, the scalp portion and the bezel portion can be cheaply manufactured in two separate parts using an injection molding process.

In addition, it has been found that by using a clamping connection, the first joint section and the second joint section can be quickly and reliably attached to each other.

BRIEF DESCRIPTION OF THE DRAWINGS

The following drawings show aspects of the invention for improving the understanding of the invention in connection with some exemplary illustrations.

DETAILED DESCRIPTION

Figure 1:
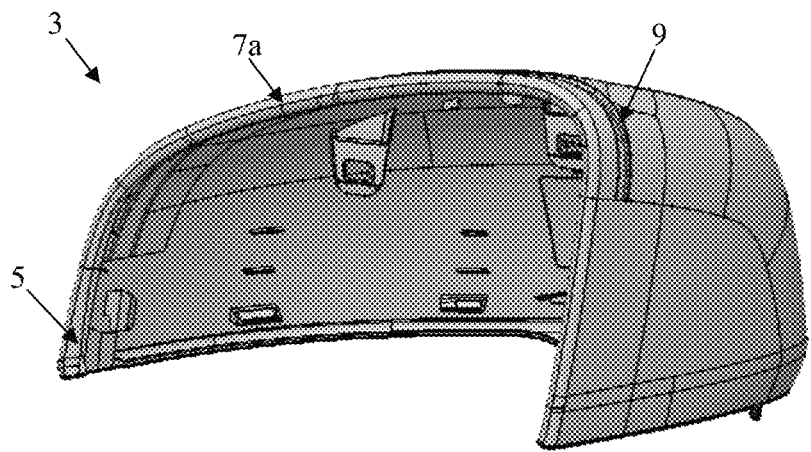
FIG. 1 is a diagram illustrating a schematic view of a scalp portion according to an embodiment of the invention.

A scalp portion 3 according to an embodiment of the invention is shown in FIG. 1. From FIG. 1 it can be seen that the scalp portion 3 has a three-dimensional shape with an opening, or cavity to cover various elements that might be included in a rear view device. Also, as shown in the figure, the scalp portion 3 can include further attachment points, e.g. lugs and/or recesses, for securing the scalp portion to further parts of a housing such as bezel and foot portions (not shown in FIG. 1).

A first joint section 5 at a first circumferential edge of the scalp portion 3 that runs partly around the opening of the scalp portion 3 is also shown in FIG. 1. In the shown embodiment, the first joint section 5 is only arranged at the opening in the vertical plane where the scalp portion 3 will be arranged partly around the bezel portion when the housing is fully assembled. However, the skilled person would know that the first joint section 5 could be also arranged around the entire opening of the scalp portion 3 to completely encircle the opening. In the later case, the foot portion would include a complementary geometry to connect to the first joint section 5.

FIG. 1 also shows a first rim 7a that extends along and/or, as shown in FIG. 1, on top of the first joint section 5. As it can be seen from FIG. 1, a channel 9 is arranged in the material of the scalp portion 3. In the shown embodiment, the channel 9 runs essentially in part parallel to the first circumferential edge of the scalp portion 3. However, the skilled person would know that the channel 9 could be also arranged differently in the material of the scalp portion 3. Also, the skilled person would know that more than one channel 9 could be used, or that no channel is arranged in the material of the scalp portion 3.

Figure 2:
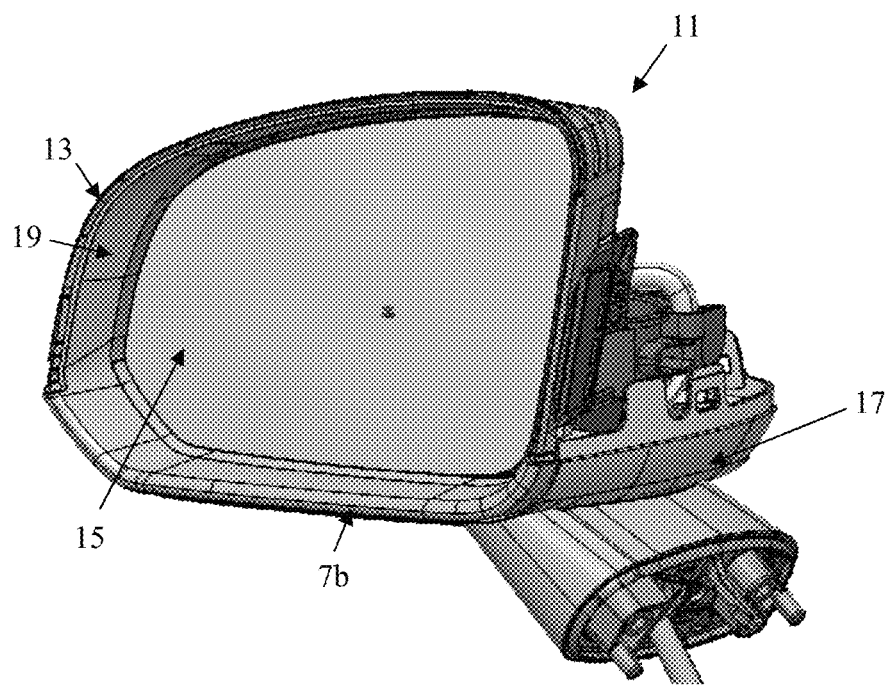
FIG. 2 is a diagram illustrating a schematic view of a bezel portion together with a rear view element and a foot portion according to an embodiment of the invention.

FIG. 2 shows a schematic view of a bezel portion 11 together with a rear view element 15 and a foot portion 17 according to an embodiment of the invention. As it can be seen from FIG. 2, the bezel portion 11 is a ring like structure and fastens the rear view element 15 which is shown as a reflective element in FIG. 2. However, the skilled person would know that the bezel portion 11 could be also differently shaped to fasten a different rear view element, for example a camera, or a combination of reflective element and camera. In the shown embodiment, the bezel portion 11 includes a second joint section 13 that runs partially around its circumference. From FIG. 2 it can be seen that a second rim 7b is disposed on the lower part of the circumference, while the second joint section 13 is disposed on the upper part of the circumference. Here, the terms 'upper' and 'lower' refer to the orientation of the bezel portion 11 as shown in the figure which essentially corresponds to the mounting position of the assembled housing on the vehicle.

The bezel portion 11 also includes an inside panel 19 that extends from the second joint section 13 and/or the second circumferential ring 7b to the rear view element 15. The inside panel 19 has the shape of an extruded surface in a direction essentially perpendicular to the circumference of the rear view element 15.

FIG. 2 shows that the bezel portion 11 and the rear view element 15 are both arranged on a foot portion 17, which can be mounted to the side of a vehicle. However, the skilled person would know that the foot portion could 17 could be also shaped differently to attach the assembled housing to various parts of the vehicle. Also, in one embodiment that is not shown in the figures, the scalp portion could include means that can be used to attach the housing directly to a suitable part of the vehicle.

Figure 3:
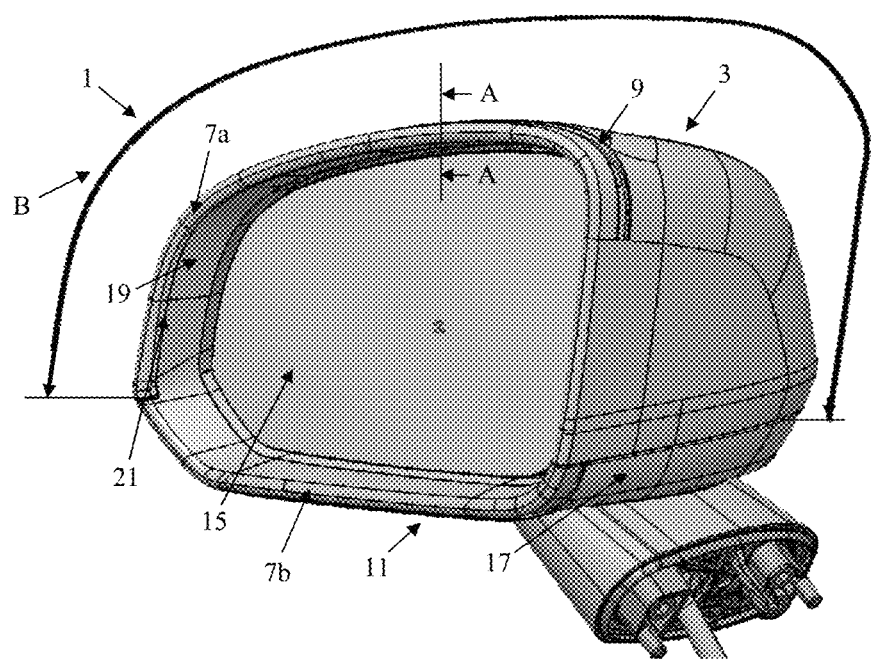
FIG. 3 is a diagram illustrating a schematic view of an assembled housing according to an embodiment of the invention.

FIG. 3 shows a schematic view of an assembled housing 1 according to an embodiment of the invention. The assembled housing 1 that is shown could include the components that are shown in FIGS. 1 and 2. As it can be seen from the figure, the first joint section and the second joint section are connected together at a separation edge 21 that is located between the first rim 7a of the scalp portion 3 and the inside panel 19 of the bezel portion 11. It is also shown that the first rim 7a and the second rim 7b merge into one rim that encircles the circumference of the rear view element 15. The first joint section and the second joint section connect to obtain an essentially flush surface.

Figure 4:
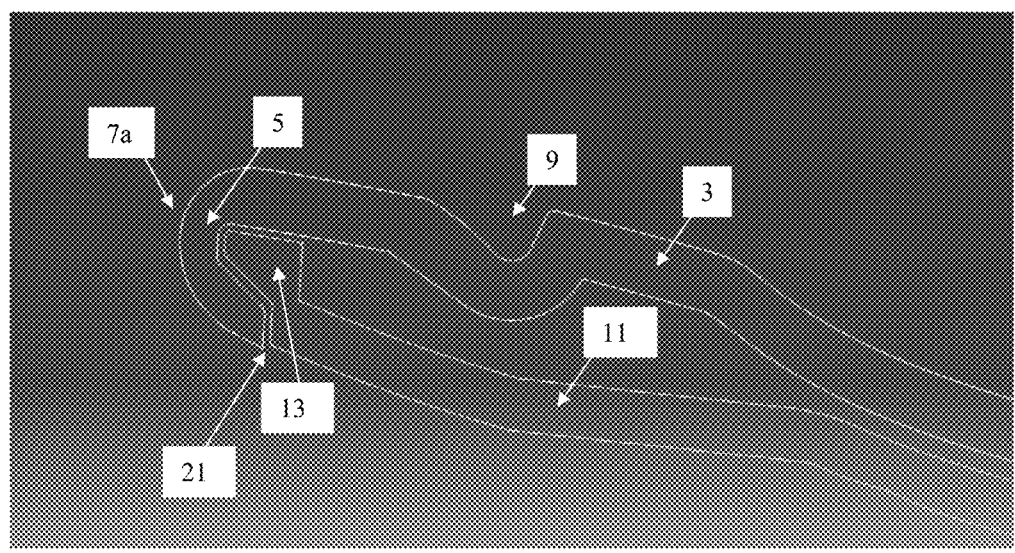
FIG. 4 is a diagram illustrating a cross-sectional view of the scalp portion and the bezel portion when mounted together according to an embodiment of the invention.

The arrows denoted 'A' mark the location of the cross-sectional view that is shown in FIG. 4, and the arrow denoted 'B' shows the pathway of section A-A around the scalp 3 and bezel 11 portion.

FIG. 4 shows the cross-sectional view A-A as indicated in FIG. 3 of the scalp portion 3 and the bezel portion 11 when mounted together according to an embodiment of the invention. As it can be seen from the figure, the first joint section 5 includes in the shown embodiment a continuous clamp extending along the pathway B that is shown in FIG. 3, and the second joint section 13 includes a continuous protrusion extending along the pathway B that is also shown in FIG. 3. Here, in the shown embodiment the continuous clamp overlaps the protrusion to obtain a flush surface at the separation edge 21. Also, in FIG. 4 it is shown that the rim 7a is formed on the scalp portion 3 by the outside curvature of the clamp. However, the skilled person would know that the scalp portion 3 and the bezel portion 11 could be mounted together in a different manner, for example, by using a different clamping connection.

The features disclosed in the claims, the specification, and the drawings maybe essential for different embodiments of the claimed invention, both separately or in any combination with each other.

REFERENCE SIGNS 1 housing
3 scalp portion
5 first joint section
7a first rim
7b second rim
9 channel
11 bezel portion
13 second joint section
15 rear view element
17 foot portion
19 inside panel
21 separation edge
A section
B pathway of section A-A around scalp portion

What is claimed is:

1. A housing for a rear view element of a rear view device for a vehicle, comprising:
   a scalp portion forming an outermost surface of the housing comprising a first joint section at a first circumferential edge extending at least partially around an opening of the scalp portion; and
   a bezel portion comprising a second joint section at a second circumferential edge extending at least partially around the bezel portion, wherein the first joint section of the scalp portion and the second joint section of the bezel portion are connectable to each other at a separation edge,
   wherein the first joint section and the second joint section are connectable to each other by a clamping connection,
   the first joint section comprises at least one clamp and the second joint section comprises at least one protrusion or vice versa,
   the clamp is adapted to at least partly overlap the protrusion to obtain a flush surface at the separation edge, which is located at least partly at an inside panel of the bezel portion,
   wherein the separation edge is located between the first rim and the inside panel of the bezel portion,
   wherein at least one of the first joint section comprises at least a continuous clamp extending along the first circumferential edge in its entirety, and the second joint section comprises at least a continuous protrusion extending along the second circumferential edge in its entirety, and
   wherein the clamp is adapted to at least partly overlap the protrusion to obtain a flush surface at the separation edge, and the clamp is curved at approximately 180° to hold the protrusion.

2. The housing of claim 1, wherein the scalp portion comprises a first rim that is adapted to complement at least in part a second rim of the bezel portion in response to the scalp portion and the bezel portion being connected together, wherein in a connected state, a resulting rim encircles the circumference of the bezel portion.

3. The housing of claim 2, wherein the separation edge is located between the first rim and the inside panel of the bezel portion.

4. The housing of claim 1, wherein the bezel portion is adapted to at least one of surround at least partly the rear view element and secure the rear view element in the housing.

5. The housing of claim 1, wherein the scalp portion is adapted to at least partly shield the rear view element.

6. The housing of claim 1, further comprising a foot portion connectable to the vehicle, wherein the foot portion is connectable to at least one of the scalp portion and the bezel portion to hold the scalp portion or the bezel portion.

7. The housing of claim 1, wherein the scalp portion comprises a channel extending on the top side of the scalp portion parallel to the separation edge.

8. The housing of claim 1, wherein at least one of the scalp portion and the bezel portion comprises plastic material, and is produced in an injection molding process.

9. A rear view display device for a vehicle, comprising at least one housing according to claim 1.

10. The rear view display device of claim 9, comprising the rear view element comprising at least one of a camera and a reflective element.

11. A vehicle, comprising the rear view display device according to claim 10.

12. A vehicle, comprising the rear view display device according to claim 9.

* * * * *